United States Patent [19]

Petit

[11] Patent Number: 5,577,034
[45] Date of Patent: Nov. 19, 1996

[54] SHAPING ARRANGEMENT

[75] Inventor: Guido H. M. Petit, Antwerp, Belgium

[73] Assignee: Alcatel N.V., Rijswijk, Netherlands

[21] Appl. No.: 389,919

[22] Filed: Feb. 16, 1995

[30] Foreign Application Priority Data

Feb. 17, 1994 [EP] European Pat. Off. ............ 94200400

[51] Int. Cl.$^6$ .................................................. H04L 12/56
[52] U.S. Cl. ........................... 370/60; 370/94.1; 370/108
[58] Field of Search ................................. 370/100.1, 108, 370/60, 60.1, 94.1, 94.2

[56] References Cited

U.S. PATENT DOCUMENTS

| | | | |
|---|---|---|---|
| 5,297,140 | 3/1994 | Boyer et al. | 370/108 |
| 5,301,193 | 4/1994 | Toyofuku et al. | 370/108 |
| 5,450,410 | 9/1995 | Hluchyj et al. | 370/108 |
| 5,469,432 | 11/1995 | Gat | 370/108 |
| 5,471,466 | 11/1995 | Cooperman | 370/108 |

OTHER PUBLICATIONS

Proceedings ISS 1992, vol. 2, 25, Oct. 1992, Yokohama, pp. 22–26 XP000337695 Wallmeier & Worster "The Spacing Policer, an algorithm for efficient peak bit rate control in ATM networks".
Proceedings ISS 1992, vol. 2, 25 Oct. 1992, Yokohama, XP000337736 Boyer, Servel & Guillemin, "The Spacer-–Controller: An efficient UPC/NPC for ATM networks".
IEEE Communications Magazine, Apr. 1993, by M. Henrion et al. "A multipath self–routing switch" pp. 46–52.

*Primary Examiner*—Wellington Chin
*Attorney, Agent, or Firm*—Ware, Fressola, Van Der Sluys & Adolphson

[57] ABSTRACT

A shaping arrangement includes a time parameter assignment unit (TAU) coupled between an input terminal (IN1/16) of an information packet switching system and a corresponding input (SIN1/16) of a switching unit (SU) of that switching system and, a filter circuit (FC) and a buffer circuit (FC) coupled in cascade between an output (SOUT1/16) of the switching unit (SU) and an output terminal (OUT1/16) of the switching system. The time assignment unit (TAU) calculates, according to a predetermined algorithm and for each information packet applied to it, the value of a time parameter as a function of the instant in time at which that information packet is applied to the input terminal of the system and inserts the calculated value in the information packet. Thereafter the information packet is switched by the switching unit (SU) to the above mentioned output (SOUT1/16) and thus to the filtering circuit (FC). The latter circuit applies the information packet to the buffer circuit (BC) or not depending on the result of the application of a filtering algorithm to that information packet. The filtering algorithm uses the value of the time parameter inserted in the information packet. The buffer circuit buffers the information packet before providing it to the output terminal during a time interval which is such that the total time interval indicated by the difference between the instant in time at which the information packet is supplied to the output terminal and the value of the time parameter included in the packet has a predetermined constant value.

8 Claims, 2 Drawing Sheets

SHAPING ARRANGEMENT

TECHNICAL FIELD

The present invention relates to a shaping arrangement for an information packet switching system with a plurality of input terminals and a plurality of output terminals coupled to corresponding inputs and corresponding outputs of a switching unit respectively, and wherein an information packet input stream applied to any one of said input terminals is transferred over said switching unit to a predetermined one of said output terminals and appears thereon as an information packet output stream, said shaping arrangement being able to shape said stream by controlling the information packet interarrival time.

BACKGROUND OF THE INVENTION

Such a shaping arrangement is already known in the art, e.g. from the article The spacer-controller : An efficient UPC/NPC for ATM networks by P. E Boyer et al, ISS '92, October 1992, Vol. 2, A.9.3. Therein, the shaping arrangement is constituted by a so called spacer module provided at an input terminal of the switching system and which realizes the shaping of the information packet input stream by adding, when necessary, a time delay to the time interval between two consecutive information packets.

OBJECTS OF THE INVENTION

An object of the invention is to provide a shaping arrangement of the above type, but which is especially adapted for being used in connection with a system such as described in the article "A multipath self-routing switch" by M. Henrion et al., IEEE Communications Magazine, April 1993, p. 46–52, and which moreover is also able to reduce the time interval between two consecutive information packets and which does not require an additional module to realize the required shaping function. The system described in the latter article includes a switching unit constituted by a so called MPSR (Multi Path Self Routing) switching unit which switches packets in a connectionless way. As a result the latter packets must be resequenced after their transfer over the switching unit. This resequencing operation is described in the last mentioned article in the chapter "Resequencing Process and MSC Transfer Delay" on pp. 50 and 51, and is based on the principle of equalizing the total delays of all packets. This means that the variable delay experienced by a packet in the switching unit is in a resequencing buffer complemented by a resequencing delay up to a maximum total value which is the same for all packets. Therefore use is made of a time stamp parameter inserted in the packet prior to its transfer over the switching unit. The value of this time stamp parameter corresponds to the instant in time at which the packet is applied at the input terminal. To allow this resequencing method to be performed correctly, packets incurring a transfer delay in the switching unit greater than the above mentioned maximum total delay are discarded in a filter circuit before being applied to the resequencing buffer.

SUMMARY OF THE INVENTION

The above object is realized due to the fact that said shaping arrangement includes a time parameter assignment unit coupled between said one input terminal and a said corresponding input of said switching unit and able to calculate according to a predetermined algorithm and for each information packet applied to said input terminal the value of a time parameter as a function of the instant in time at which said information packet is applied to said input terminal and to insert the thus calculated value in said information packet prior to the information packet being switched by said switching unit from said corresponding input to an output coupled to said output terminal, and that said shaping arrangement further includes a filter circuit and a buffer circuit coupled in cascade between said output of said switching unit and said predetermined output terminal, said filter circuit being able to apply said information packet to said buffer circuit or not depending on the result of the application of a filtering algorithm to said information packet, said second algorithm using the value of the time parameter inserted in said information packet, and said buffer circuit being able to buffer said information packet thus applied to it and prior to supplying it to said predetermined output terminal for a time interval which is such that the total time interval indicated by the difference between the instant in time at which said information packet is supplied at said output terminal and the value of said time parameter included in said packet has a predetermined constant value.

By calculating the value of the time parameters inserted in the packets according to the predetermined algorithm, the interval during which the packets are buffered in the buffer circuit is varied in such a way that a predetermined shape of the stream of packets is realized at the output terminal. More specifically, by for instance adding or substracting a predetermined value to or from the time instant at which a packet is applied to the input terminal, the packet is afterwards kept longer/shorter in the resequencing buffer than when there would be no shaping, i.e. for a zero d value. Thus the time interval between the packet and the previous packet is extended/shortened, thereby realizing a shaping function and making it possible, in case of shortening, to reduce the time interval between two consecutive information packets. To what extent this extension/shortening is realized, i.e. what type of shaping is performed depends on the above mentioned predetermined value which can for instance be determined according to the result of an input shaping algorithm applied to the packet at the moment the time parameter value is assigned.

As mentioned earlier, packets which remain too long in the switching unit have to be discarded in order to be able to perform the above described resequencing. The filtering algorithm according to which this discarding or filtering of a packet is performed is function of the value of the time parameter inserted in that packet, of the maximum total transfer delay of a packet in the switching system and of the maximum value of d. How this filtering algorithm is defined will be explained later.

The present shaping arrangement is especially suited for being used in the switching system as described in the last mentioned article, since this latter system already includes a time parameter assignment unit for inserting a time stamp value in the packets, as well as a filter circuit and a buffer circuit to resequence the packets. Indeed, from the above it is clear that it suffices to have the time parameter assignment unit of the known switching system operated in a different way and to adapt the used filtering algorithm to realize the present shaping arrangement. The latter adaption has to be performed because of the manipulation of the time stamp. How the filtering algorithm is adapted will be explained later. It should be noted that the shaping function is realized at the above mentioned output terminal which is usually connected to an input of an output buffer provided to solve possible output contention problems.

As the subject shaping arrangement realizes a new shaping method, the present invention also relates to this method.

BRIEF DESCRIPTION OF THE DRAWINGS

The above mentioned and other objects and features of the invention will become more apparent and the invention itself will be best understood by referring to the following description of an embodiment taken in conjunction with the accompanying drawings wherein.

BEST MODE FOR CARRYING OUT THE INVENTION

Figure 1:
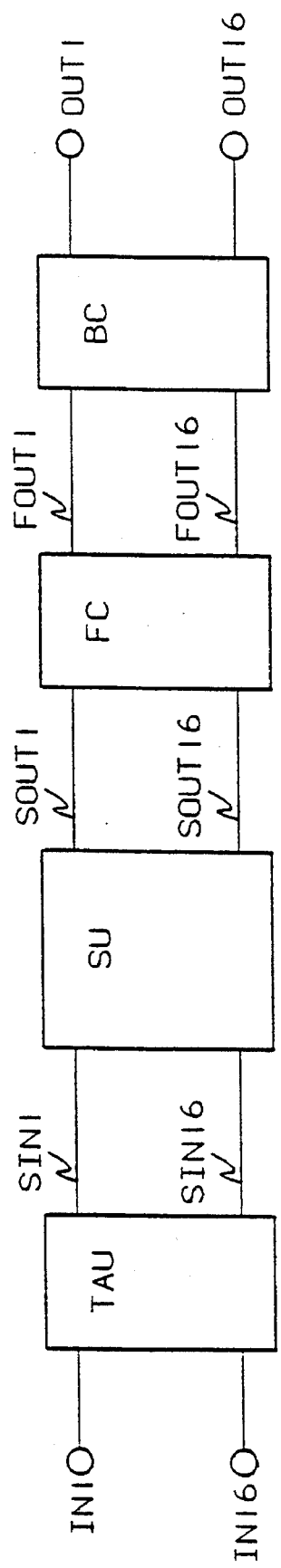
FIG. 1 represents an information packet switching system including a shaping arrangement according to the invention.

The system represented in FIG. 1 has 16 input terminals IN1 to IN16 and 16 output terminals OUT1 to OUT16. The input terminals are connected to respective inputs of a time parameter assignment unit TAU, outputs of which are coupled to inputs SIN1 to SIN16 of a switching unit SU which is a multi-path self-routing switch (MPSR) such as described in the second mentioned article. Outputs SOUT1 to SOUT16 of SU are connected to respective inputs of a filter circuit FC whose outputs FOUT1 to FOUT16 are coupled to respective inputs of a buffer circuit BC connected to the output terminals OUT1 to OUT16.

In each packet of a packet input stream applied to one of its inputs, TAU inserts a time parameter TSTP whose value is according to a predetermined algorithm derived from the time instant ACLKi at which this packet is applied to this input. More specifically, the value of the time parameter TSTP is obtained by adding to the above time instant ACLKi an algebraic value d determined by the result of the application of an input shaping algorithm applied to the information packet input stream. A specific input shaping algorithm, i.e. a so called virtual shaping algorithm, is for instance described in the first mentioned article under chapter 3.1.

The packet and its inserted time parameter TSTP are then transferred over SU and applied to FC which discards it or not according to a filtering algorithm which will be determined later. A not discarded packet is then applied to BC, which buffers it to delay it during an interval equal to the difference between the earlier mentioned maximum total delay, Dmax, which corresponds to the maximum transfer delay of the packets over the switching system. As a result, the packets are resequenced and the shaping operation is realized. Indeed, thanks to the addition or substraction of d to or from the time instant at which the packet is applied to the switching system, the packet is kept longer/shorter in the BC than in case where no shaping is performed, i.e. in the case where d equals zero. How much longer or shorter the packet is kept in BC is determined by the kind of shaping to be realized, i.e. by the value of d as determined by the result of the application of the input shaping algorithm by TAU to the packet.

From the above it is clear that the shaping function can be realized not only by extending the time interval between two consecutive packets as in the known shaping arrangements, but also by reducing that time interval. The structure of the above described units and circuits being obvious to a person skilled in the art thanks to their functional description as given above and in the referenced articles, these units and circuits are not described in more detail.

In the following the filtering algorithm is determined with reference to FIGS. 1 and 2 and taking as an example a packet which is applied to IN1 and which is via SIN1, SOUT1 and FOUT1 transferred to OUT1.

Figure 2:
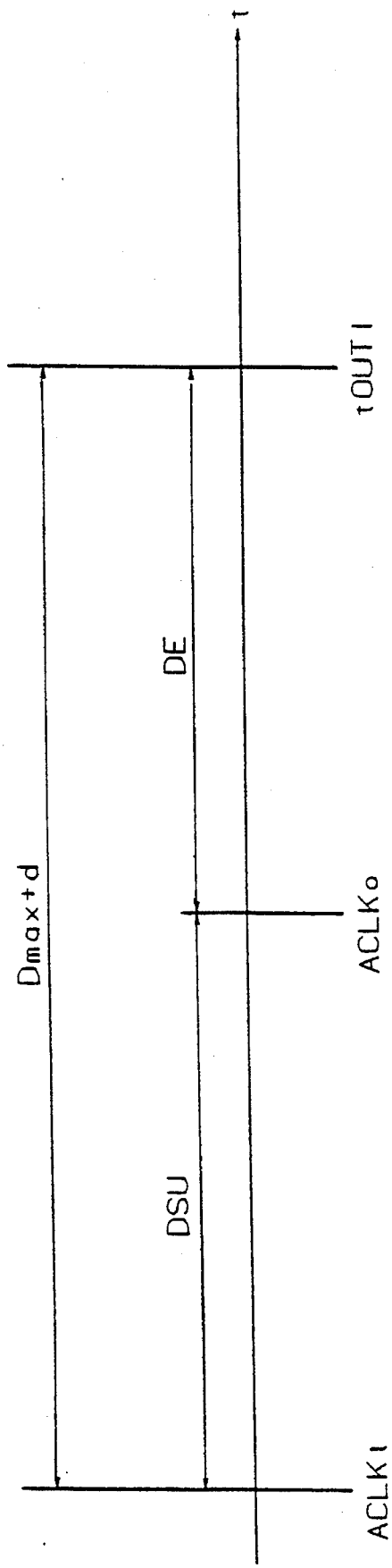
FIG. 2 is a time diagram illustrating the shaping and resequencing principle used in the system of Fig. 1.

In FIG. 2, following symbols are used:

Dmax is, as mentioned earlier, the maximum transfer delay of a packet over the packet switching system, packets staying in SU for a longer time interval being deleted;

d is the above described algebraic value;

ACLKi is the absolute clock value of a clock at an input terminal, e.g. IN1, when a packet is applied at that input;

ACLKo is the absolute clock value of a clock at an output of SU, e.g. at SOUT1, when a packet is provided at that output;

tOUT1 is the time instant at which a packet is provided at OUT1;

DSU is the transfer delay of a packet over SU;

DE is the time interval over which a packet is delayed in BC.

It should be noted that the clocks at the input terminal and at the output of SU have to be synchronized within a predetermined range. How this synchronization can be realized is well known in the art and is not described herein since it is no part of the invention.

The time value TSTP assigned to the time parameter of the packet applied to IN1 equals ACLKi + d, where d is the above-mentioned algebraic value which is negative when an interarrival time delay catch up has to be realized, i.e. when the packet has to stay less long in BC than without shaping, and which is positive when such a delay has to be added, i.e. the packet has to stay longer in BC. As mentioned earlier, the exact value of d is determined by the input shaping algorithm.

Since the algebraic value d is added to ACLKi in order to obtain the value of TSTP, the filtering algorithm has no longer to take into account the maximum transfer delay of the system Dmax, but also the value of d. However, since this value is not known by FC, the maximum value of d is taken into account. This maximum value can be different for a negative and for a positive d, i.e. MAX1 for a positive d and MAX2 for a negative one. More specifically, and since at SOUT1 it is not known whether d added at IN1 was negative or positive, the following condition has to be satisfied:

$DE <= Dmax + MAX1 + MAX2$ and $DE >= 0$, with $DE = Dmax + MAX2 - (ACLKo - TSTP)$ This means that:

$ACLKo - TSTP \leq -MAX1$ and $ACLKo - TSTP \leq Dmax + MAX2$ or $ACLKo - TSTP + MAX1 >= 0$ (1) and $ACLKo - TSTP + MAX1 <= Dmax + MAX2 + MAX1$ (2).

When working with relative clocks, as is usually done in practice, $TSTP = (ACLKi + d)$ @ RCR, and $RCLKo = ACLKo$ @ RCR, where: @ is the modulo operator;

RCR is the range of the relative clock; and

RCLKo is the value of the relative clock at the time instant the packet is provided at SOUT1. Relation (1)

can then be realized by applying the modulo operator to the first part of (1) which then becomes:

(RCLKo−TSTP + MAX1 + RCR) @ RCR. Equation (2) then becomes:

$$(RCLKo-TSTP+MAX1+RCR)@RCR-MAX1<=Dmax+MAX2.$$

Packets for which the above condition is not fulfilled have to be discarded from the system. Thus the filtering in FC has to be performed based on the above filtering algorithm.

It should be noted that for the sake of clarity of the description, TAU, FC and BC have each been represented as one functional block in FIG. 1. There functionality can however be implemented in separate input and output modules for each input and output terminal of the switching system respectively.

While the principles of the invention have been described above in connection with specific apparatus, it is to be clearly understood that this description is made only by way of example and not as a limitation on the scope of the invention.

I claim:

1. A shaping arrangement for an information packet switching system with input terminals (IN1/IN16) and output terminals (OUT1/OUT16), having a switching unit (SU) for transferring an information packet applied to said input terminals (IN1/IN16) to said output terminals (OUT1/OUT16), characterized in that said shaping arrangement comprises:

a time parameter assignment unit (TAU) coupled between said input terminals (IN1/IN16) and inputs (SIN1/SIN16) of said switching unit (SU), for calculating according to a predetermined time parameter algorithm a time parameter for said information packet as a function of a first instant in time that said information packet is applied to said input terminals (IN1/IN16), and for inserting the time parameter in said information packet;

a filter circuit (FC) coupled to outputs (SOUT1, . . . , SOUT16) of said switching unit (SU), for applying a filtering algorithm to said information packet, and for discarding said information packet based on the time parameter; and a buffer circuit (BC) coupled to said filter circuit (FC), for buffering said information packet for a buffer time interval so that there is a predetermined constant time difference between the time parameter and a second instant in time at which said information packet will be supplied to said output terminals (OUT1/OUT16).

2. A shaping arrangement according to claim 9, characterized in that said time parameter assignment unit (TAU) applies said predetermined time parameter algorithm by adding a predetermined algebraic value to said first instant of time at which said information packet is applied to said input terminal (IN1/IN16), an algebraic value depending on a result of an input shaping algorithm applied to said information packet.

3. A shaping arrangement according to claim 2, characterized in that said algebraic value has a maximum value which together with said value of said time parameter is taken into account in said filtering algorithm.

4. A shaping arrangement according to claim 3, characterized in that said filtering algorithm is determined by a formula:

$$(RCLKo-TSTP+MAX1+RCR)@RCR-MAX1\leq=Dmax+MAX2$$

where for said information packet:

RCLKo is a relative clock value of a relative clock at the instant said information packet is provided at said output terminal (SOUT1, . . . . SOUT16) of said switching unit(SU);

TSTP equals the value of said time parameter for said information packet;

MAX1 is a first maximum value in case where said algebraic value is positive;

RCR is a range of said relative clock;

@ is modulo operator;

Dmax is a maximum time interval needed for transferring said information packet from said input terminal (IN1/IN16) to a predetermined output terminal (OUT1/OUT16); and MAX2 is a second maximum value in case where said algebraic value is negative, said filtering circuit (FC) applying said information packet to said buffer circuit (BC) only when said formula applies to said information packet.

5. A method for shaping a stream of information packets supplied at an output terminal (OUT1/OUT16) of a information packet switching system having a plurality of input terminals (IN1, . . . , IN16) and a plurality of such output terminals (OUT1, . . . , OUT16), and wherein an information packet input stream applied to any one of said input terminals (IN1, . . . , IN16) is transferred over a switching unit (SU) to a predetermined one of said output terminals (OUT1/OUT16) and appears thereon as said stream of information packets, said shaping being realized by controlling the information packet interarrival time, characterized in that said method includes for each of said information packets of said information packet input stream the steps of:

incorporating a value of an input time parameter in said information packet before a transfer thereof over said switching unit (SU), the value of said input time parameter being derived according to a predetermined algorithm from an input time instant at which said information packet is applied to said input terminal (IN1, . . , IN16);

either discarding or not discarding said information packet after the transfer thereof over said switching unit (SU), depending on a result of a filtering algorithm applied to said information packet after the transfer, said filtering algorithm taking into account the value of said time parameter included in said information packet, buffering said information packet that is not discarded before applying it to said predetermined output terminal (OUT1/OUT16) for a time interval which is such that a total time interval indicated by a difference between an output time instant at which said information packet is supplied at a predetermined output terminal (OUT1/OUT16) and the value of said input time parameter included in said information packet has a predetermined constant value.

6. A method according to claim 5, characterized in that according to said predetermined algorithm, a predetermined algebraic value is added to said input time instant at which said information packet is applied to said input terminal, said algebraic value depending on a result of an input shaping algorithm applied to said information packet.

7. A method according to claim 6, characterized in that said algebraic value has a maximum value, and that said filterinq algorithm takes into account said maximum value and said input time parameter .

8. A method according to claim 7, characterized in that said second algorithm is determined by a formula:

$$(RCLK_o - TSTP + MAX1 + RCR) @ RCR - MAX1 \leq = Dmax + MAX2$$

where for said information packet:

RCLKo is a relative clock value of a relative clock at the instant in time said information packet is provided at an output terminal (SOUT1, ... SOUT16) of said switching unit (SU);

TSTP equals the value of said time parameter for said information packet;

MAX1 is a first maximum value in case where said algebraic value is positive;

RCR is a range of said relative clock;

@ is modulo operator;

Dmax is a maximum time interval for transferring said information packet from said input terminal (IN1/IN16) to said output terminal (OUT1/OUT16); and MAX2 is a second maximum value in case where said algebraic value is negative, said information packet being discarded when said formula does not apply to said information packet.

* * * * *

UNITED STATES PATENT AND TRADEMARK OFFICE
CERTIFICATE OF CORRECTION

PATENT NO. : 5,577,034
DATED : Nov. 19, 1996
INVENTOR(S) : G. Petit

It is certified that error appears in the above-indentified patent and that said Letters Patent is hereby corrected as shown below:

At column 6, line 3, (claim), please change
"(SOUT1, .... SOUT16)" to --(SOUT1, ..., SOUT16)--;

At column 6, line 10, (claim), please change
"is modulo operator" to --is a modulo operator--;

At column 6, line 66, (claim), please change
"filterinq" to --filtering--;

At column 7, line 9, (claim), please change
"(SOUT1, .... SOUT16)" to --(SOUT1, ..., SOUT16)--; and At column 8, line 2, (claim), please change
"is modulo operator" to --is a modulo operator--.

Signed and Sealed this

Twenty-fifth Day of March, 1997

Attest:

BRUCE LEHMAN

Attesting Officer    Commissioner of Patents and Trademarks